3,188,189
METHOD FOR SEVERING A MOIL FROM A
GLASS BODY
Gerrit de Leeuw, Leerdam, Netherlands, assignor to N.V. Vereenigde Glasfabrieken (United Glassworks), Schiedam, Netherlands, a limited-liability company of the Netherlands
Filed Aug. 14, 1961, Ser. No. 131,173
Claims priority, application Netherlands, Aug. 13, 1960, 254,855
1 Claim. (Cl. 65—113)

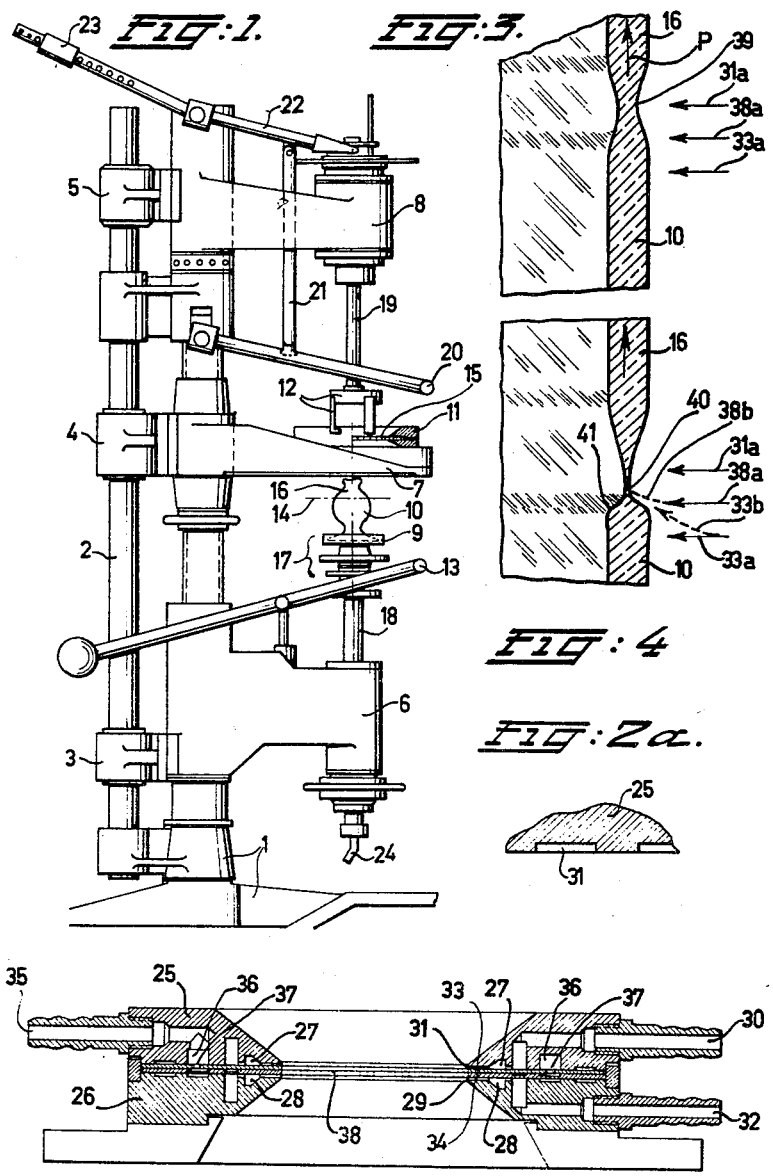

The invention relates to improvements in the method of severing a moil or ring from a rotary glass body by a burn-off operation wherein the glass body is vertically positioned on a base and the cutting is effected by rotating the glass article in a flame corona which is arranged along the circumference of the object in the plane of severance. Methods of the described type are known, for example, as disclosed in U.S. Letters Patent No. 1,577,538 and No. 2,570,899.

It is an object of the invention to improve this known method for the manufacture of high quality glass objects such as goblets, chalices and lead crystal wares, in a highly mechanized process, so that a product is obtained which can measure up to the standard of quality which so far could only be reached by highly skilled hand labor.

It is a further object of the invention to obtain a refinement of the finishing of such glass ware in a mechanized process particularly of the edge of the article after the severing operation.

It is a still further object of the invention to provide an improved corona burner for the above purpose.

It is known in the art to direct, during the severing operation, a blast of cooling fluid against the softened glass on the moil side of the flame in a localized region extending horizontally around the moil adjacent the region where the severing flame is applied to the work piece.

It has been found that, with the above objects in mind, improvements over the prior art are obtainable by the introduction of a cooling area both above and below the region where the severing flame is applied and by a construction of a corona burner wherein the cooling areas are exactly determined and close to each other.

The application of the invention is especially advantageous when the moil is seized from above by a clutch which, during the softening of the glass, pulls the moil or waste piece upwardly under the influence of an adjustable weight or spring load so as to stretch the softening glass in upward direction from the area where the glass is to be cut in the planes of the corona burner.

Other advantages of the invention will appear from the following detailed description of an illustrative embodiment which is to be read in connection with the accompanying drawing, wherein:

FIGURE 1 is a side elevational view of a burning off apparatus suitable for the practice of the method according to the invention.

FIGURE 2 is an enlarged cross-sectional view of an annular or coronary burner which is employed in carrying out the method.

FIGURE 2a is an enlarged detail, cross-sectional view of one of the cooling fluid ducts or slits of the burner of FIGURE 2.

FIGURES 3 and 4 are cross-sectional views of a wall part of the glass workpiece during two successive phases in the burning-off process.

Referring to FIG. 1 in detail, it will be seen that a burning-off apparatus of the type suitable for use in accordance with this invention includes a base 1, of which only the upper end is visible, supporting a guide column 2 along which guide sleeves 3, 4, 5 for three tool carriers 6, 7 and 8, respectively, are mutually adjustable in a vertical direction. The tool carrier 6 bears the base 9, on which the glass workpiece 10 is positioned, the tool carrier 7 bears the annular burner 11 and the tool carrier 8 bears the clutch 12.

In FIG. 1, the two main tool carriers 6 and 8 are shown spaced with respect to the intermediate carrier 7, which is moved into a middle position, and the clutch 12 and the base 9 are shown almost in their extreme drawn out positions in order to show the parts separately. However, when practicing the method according to this invention, the carriers are adjusted along column 2 so that, by raising the lever 13, the base 9 can be brought to a level at which the line of severance 14 of the article 10 is exactly situated in the cutting plane 15 of the annular burner 11 and the clutch 12 can be applied to the waste piece or the moil 16, by lowering the clutch bearing shaft 19 by means of the handle 20. A rod 21 connects the arm of handle 20 to the lever arm 22, which is connected with the end of the shaft 19. The base 9 can form a part of a so called oscillating element 17. The latter allows a small displacement of the base in a radial direction with respect to the axis of rotation, so that the glass object 10 can be centered in a position wherein the circumferential circle at the location of the line 14, where the moil 16 is to be severed, is practically coaxial with the annular burner 11. In this position the base 9 is then fixed with respect to the rotating holder shaft 18. The object 10 can be retained on the base 9 and the base fixed to the shaft 18 by vacuum means for which purpose a vacuum duct 24 is connected to the lower end of the hollow shaft 18.

In the embodiment described, the shaft 18 and the shaft 19 of the clutch 12 are rotated at the same speed. A constant tensile force is exerted in an upward direction on the clutch by means of the weight 23 on the lever arm 22. In the case of a chalice, such tensile force may be of the order of 50 to 100 grams.

Burning-off is executed in the plane of severance 15 of the burner, for which purpose the line 14 of the object 10 is brought in the plane 15. After severance the edge of the workpiece 10 is "burnt in," as will be described hereinafter.

The removal and release of the waste piece 16 needs no further explanation because known automatic mechanisms can be used therefore, for example, as described in U.S. Letters Patent No. 1,577,538 and No. 2,571,066.

The annular burner 11 particularly adapted for the practice of the method embodying this invention will now be described in detail with reference to FIGS. 2 and 2a. The bumper 11 comprises two ring pieces 25 and 26 having annular, trough-shaped cavities 27 and 28, respectively, opening toward each other adjacent the inner peripheries of the ring pieces and being separated by two thin annular intermediate plates 33 and 34.

The surfaces of the ring pieces 25 and 26 seating against the intermediate plates 33 and 34 between the cavities 27 and 28 and the inner peripheries of the ring pieces are provided with series of narrow slits 31 and 29, respectively. As shown on FIG. 2a, each of the slits 31, and also each slit 29, is relatively wide and of small height. The slits 29 and 31 extend radially from the respective cavity 28 or 27 to the inner periphery of the ring piece. Further, cooling fluid, for example, air, is supplied to the cavities 27 and 28 through air ducts 30 and 32 so that cooling air is annularly blown against the glass through the apertures at the inner ends of the slits 29 and 31. It is obvious that due to this construction the cumbersome boring of canals for cooling air coronas is avoided, such canals being defined by the above mentioned slits, which can be formed by milling the surface of the rings 25 and 26, and by the flat surfaces of the annular discs 33 and 34 respectively. In this way the areas of the air streams are also limited to flat zones immediately above and below the flame canals which will now be described. In order to obtain these flame canals, radially extending slits are also milled in the confronting plane surfaces of the plates 33 and 34. These slits are so small that they are not separately visible in the drawing and are only generally indicated by the numeral 38. A combustible mixture of gas and oxygen is supplied through the duct 35 into a ring-shaped channel 36 in the ring piece 25 from which the mixture passes through apertures 37 provided in the ring plate 33 into the radial slits 38 between plates 33 and 34.

In FIGURES 3 and 4 arrows 31a, 33a and 38a indicate the air streams and flames respectively directed against the surface of the glass workpiece. Arrow P indicates that the moil part 16 is pulled upwardly during the severing action. During the first phase shown in FIGURE 3, the glass wall softened by the flames 38a is constricted in an area just above the plane of the flames 38a. The constriction at this place is caused by the fact that the glass body 10 is kept in place and cooled by the air stream 33a just below the soft area opposite the flames 38a and because softened glass is continuously pulled upwardly with the moil 16. The main effect of the cooling area resulting from the air stream 31a is to cause the soft glass transported upwardly to become viscous or harden to such an extent that the soft glass is continuously drawn only from the area just above the plane of the flames 38a. For this reason, the constriction will become more pronounced in a lower region increasingly close to the zone of the flames 38a, as shown on FIG. 4, so that, at the moment of severance, only a small glass tip remains on top of the edge of the glass body 10. Once the moil 16 has been separated and removed in the upward direction, the air stream 31a no longer impinges against a glass wall and therefore the air pressure below the area of flames 38a will become higher than that above the area of the flames. Thus, the air stream 33a will bend upwardly, as indicated by the arrow 33b in dotted lines, and force the flames 38a to bend slightly in the upward direction, as indicated by the broken line 38b. Though the glass body is maintained in the same place, the described bending of the flames by the air streams 33b ensures that the flames will be most favorably positioned to cause the above mentioned glass tip remaining after severance of the moil to flow back into the edge of the glass body 10 for finishing that edge in an efficient manner. Further, by the application of a cooling area immediately above and below the area of the flames in strictly defined regions, as will be apparent from the above description, the flow of viscous glass is kept under control so that a very regular and accurate finishing of the edge of the glass article is obtained in an automatic process.

What I claim is:

A method of severing the moil from the formed body of a glass workpiece comprising vertically positioning said workpiece in a flame corona with the moil uppermost and with the desired plane of severance between the body and moil being located at the level of the plane of said flame corona, rotating the glass workpiece until the workpiece is uniformly heated by said flame corona to a temperature sufficient to soften the glass at said plane of severance, continuously pulling upwardly on said moil so that, as the glass workpiece is softened by said flame corona, the softened glass is progressively reduced in thickness and then severed with upward removal of the said moil from said body, and directing cooling fluid radially inward in planes which are parallel to and disposed immediately above and below said plane of the flame corona to maintain the glass against which the cooling fluid impinges at a temperature below the softening point temperature of said glass during softening of the glass workpiece at said plane of severance and for a period following removal of said moil from said body so that the cooling fluid in the plane immediately above the flame corona ensures that, during softening of the workpiece, the reduction in thickness of the workpiece will occur immediately above said plane of severance and, after said removal of the moil, the cooling fluid in the plane immediately below the flame corona will divert the flame corona upwardly to ensure finishing of the edge of said body while the positioning of the body is unchanged.

References Cited by the Examiner

UNITED STATES PATENTS

| 2,215,980 | 12/40 | Schreiber | 65—113 |
| 2,570,899 | 10/51 | Wolf | 65—120 X |
| 2,764,847 | 10/56 | Buell | 65—269 X |

FOREIGN PATENTS 85,234  2/86  Germany.

DONALL H. SYLVESTER, *Primary Examiner.*